United States Patent [19]

Imoto et al.

[11] Patent Number: 4,909,584

[45] Date of Patent: Mar. 20, 1990

[54] OPTICAL MULTI/DEMULTIPLEXER AND OPTICAL MODULE USING THE SAME

[75] Inventors: Katsuyuki Imoto, Sayama; Hirohisa Sano, Kokubunji; Hideaki Tsushima, Hachioji, all of Japan

[73] Assignee: Hitachi, Ltd., Tokyo, Japan

[21] Appl. No.: 204,551

[22] PCT Filed: Dec. 11, 1987

[86] PCT No.: PCT/JP87/00969
§ 371 Date: Mar. 23, 1988
§ 102(e) Date: Mar. 23, 1988

[87] PCT Pub. No.: WO88/04785
PCT Pub. Date: Jun. 30, 1988

[30] Foreign Application Priority Data

Dec. 19, 1986 [JP] Japan .................. 61-301258
Mar. 6, 1987 [JP] Japan .................. 62-50037
Mar. 13, 1987 [JP] Japan .................. 62-56506

[51] Int. Cl.$^4$ ............................................. G02B 6/26
[52] U.S. Cl. ............................... 350/96.15; 350/96.16
[58] Field of Search ............... 350/96.11, 96.12, 96.13, 350/96.14, 96.15, 96.16

[56] References Cited

U.S. PATENT DOCUMENTS 4,341,438 7/1982 Seki et al. .................. 350/96.16

Primary Examiner—Frank Gonzalez
Attorney, Agent, or Firm—Antonelli, Terry & Wands

[57] ABSTRACT

This invention relates to an optical multi/demultiplexer which will be useful for optical wavelength-division multiplexing communication using an optical fiber.

In order to obtain high isolation, the optical multi/demultiplexer of the present invention constitutes three, mutually the same optical multi/demultiplexers by use of a main waveguide and first, second and third branch waveguides. Two rays of light having mutually different wavelengths, which are incident into the main waveguide, are isolated completely by the three optical multi/demultiplexers and are outputted.

14 Claims, 13 Drawing Sheets

FIG. 10
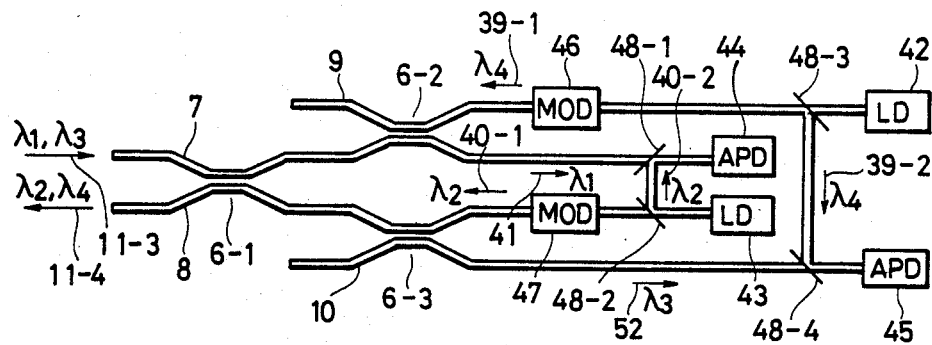
FIG. 11(a)
FIG. 11(b)
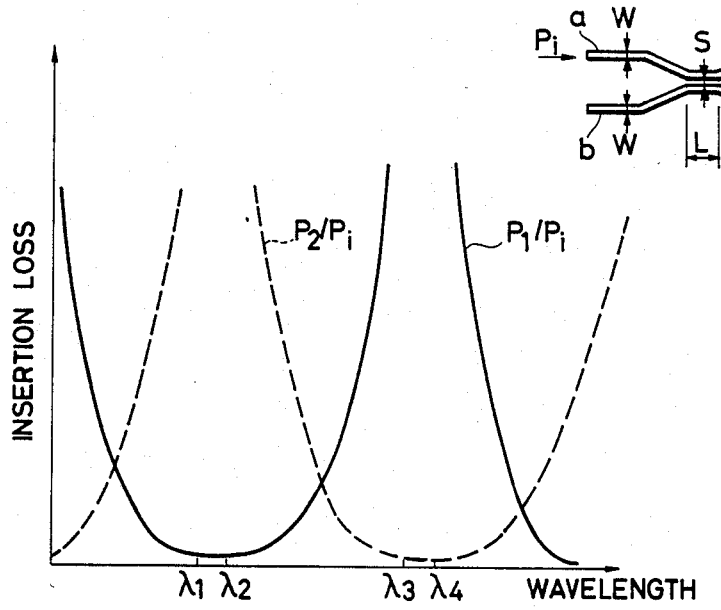

(X-X' CROSS SECTION)

(X-X' CROSS SECTION)

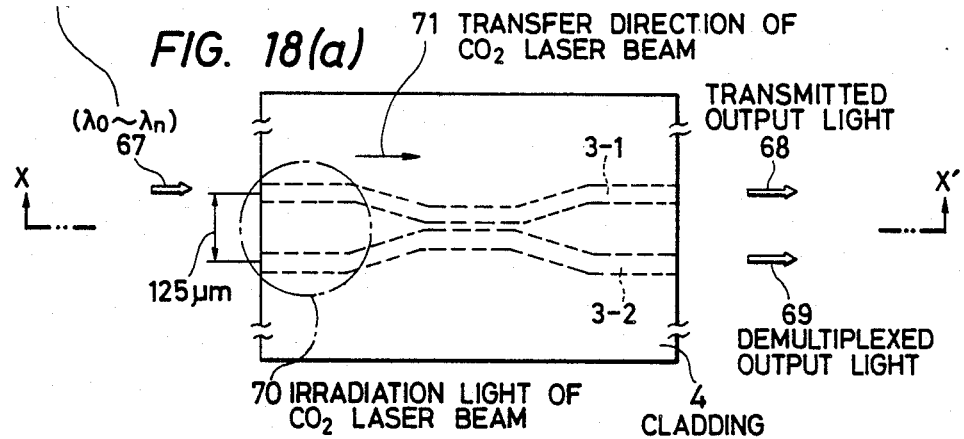
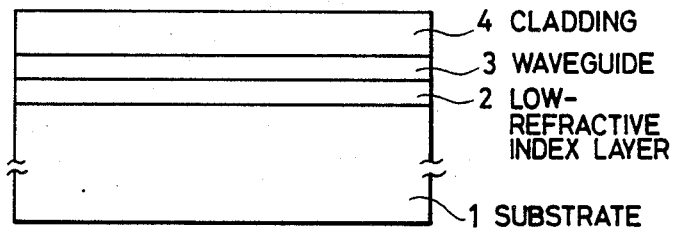
FIG. 18(a), FIG. 18(b) (X–X' CROSS SECTION)

OPTICAL MULTI/DEMULTIPLEXER AND OPTICAL MODULE USING THE SAME

TECHNICAL FIELD

This invention relates generally to an optical multi/demultiplexer and more particularly, to an optical device such as an optical multiplexer, an optical demultiplexer, an optical multi/demultiplexer, etc., for optical wavelength-division multiplexing transmission of optical fiber communication, and to an optical module produced by integrating these optical devices with semiconductor light emitting and receiving devices.

BACKGROUND ART

Optical wavelength-division multiplexing transmission technique in optical fiber communication is of importance in order to economize a communication system and an optical multi/demultiplexer is an essential device for the optical wavelength-division multiplexing transmission.

Discrete type optical multi/demultiplexers such as an interference filter type and a grating type have been predominant in the past as the structure of the optical multi/demultiplexers. Studies have been made on a waveguide type structure, on the other hand, in order to accomplish a lower cost of production and one-chip monolithic type device. Mention can be made of an optical directional coupler type demultiplexer described in "1978 National Conference On EECE, Paper S6-2" by Sasaki and Ohguro, as an example of such prior art technique. According to this prior art reference, two optical waveguides a and b, each having a width W, are juxtaposed in a length L with a spacing S between them as shown in FIG. 7 of the accompanying drawings. Symbol $n_1$ represents the refractive index of each optical waveguide and $n_2$ represents the refractive index of the other portion. This prior art obtains the optical branching characteristics by tilizing the wavelength dependence of coupling of these two optical waveguides. According to this arrangement, two-wavelength multiple light Pi entering from a port 1 is isolated to light $P_1$ having a wavelength $\lambda_1$ and light $P_2$ having a wavelength $\lambda_2$ and they outgo from ports 2 and 3, respectively. FIG. 8 shows another structure which consists of a plurality of directional couplers 4-1 ~ 4-3 and a plurality of optical multiplexers 5-1 ~ 5-2 in order to improve the isolation characteristics.

DISCLOSURE OF INVENTION

In the optical demultiplexer having the structure shown in FIG. 7, the bandwidth for keeping a transmission loss of at least 25 dB is only about 20 nm when optical branching of wavelength of 1.3 μm and wavelength of 1.55 μm is considered, as represented by wavelength characteristics of FIG. 9. For this reason, if the wavelength values of 1.3 μm and 1.55 μm change due to the temperature change of a semiconductor light emitting device (or semiconductor laser), an optical signal having an undesired wavelength leaks into the system in which the desired wavelength s isolated, so that interference (or so-called "cross-talk") occurs and signal quality deteriorates.

The optical demultiplexer having the structure shown in FIG. 8 can have a large bandwidth for keeping high isolation, but its overall size becomes great because its structural dimension is determined by three mutually different directional couplers and two multiplexers. Accordingly, losses increase due to waveguide loss. Since corresponding masks must be prepared for the directional couplers having mutually different structural dimensions, the cost of production increases. The device cannot be produced easily because the structure is complicated. Particularly because the size is great, at least three exposure masks for patterning are necessary so that the cost of production increases while production accuracy is low and production itself is difficult.

The problem common to FIGS. 7 and 8 is as follows. When an optical module is produced by forming integrally a semiconductor device(s) (a light emitting device or a light receiving device or both) on the side of the ports 2 and 3, the optical module must be replaced as a whole if one or both of the semiconductor optical devices exhibit degradation of quality or get broke, and this is extremely uneconomical. In other words, the optical demultiplexer must be discarded though it can still be used. When the optical module is broken, a long time is necessary for exchange and optical communication must be suspended in the interim. In other words, since the optical module itself is not equipped with any fail-safe features, the suspension of communication will cast gloom on users and will exert adverse influences on society.

The present invention can solve the problems described above by coupling a first branch waveguide for branching an optical signal having a wavelength $\lambda_1$ in parallel with a main waveguide for propagating optical signals of wavelengths $\lambda_1$ and $\lambda_2$, coupling further second branch waveguide for branching the optical signal of the wavelength $\lambda_1$ in parallel with the output side of the main waveguide and coupling a third branch waveguide for branching the optical signal of the wavelength $\lambda_1$ in parallel with the output side of the first branch waveguide. The optical signals can be multiplexed through back-flow. The problems described above can be solved by connecting semiconductor optical devices on the output sides of the waveguides and connecting optical switches to the input sides of the main waveguide and the first branch waveguide.

Three optical multi/demultiplexers having the same structure are constituted by use of the main waveguide and the first, second and third branch waveguides in such a manner that a filter portion for blocking an undesired wavelength is formed at a port for branching and transmitting a desired wavelength, and high isolation characteristics can thus be accomplished. Here, each optical multi/demultiplexer has the function of the optical demultiplexer or optical multiplexer or both of them in accordance with the mode of flowing the optical signal. Since the optical multi/demultiplexer is the same, the structure described above can be accomplished at a low cost of production by preparing one optical multi/demultiplexer mask and transferring and exposing the mask, and an optical multi/demultiplexer can be fabricated highly accurately.

Incidentally, if the structural parameters (the width and thickness of core waveguide, the difference of refractive indices, etc.) of the three optical multi/demultiplexers are different, the center wavelength branched by each optical multi/demultiplexer will deviate from the other so that the overall branching characteristics will become double robe characteristics and the increase of the insertion loss and the decrease of the attenuation of the blocking zone will be invited. Therefore, it is of importance that the structural parameters are the same. Furthermore, fail-safe operation and a self diagnosis/restoration function can be accomplished by disposing light emitting or receiving devices on the four output port side of the structure described above, connecting 1×2 type optical switches on the two input side and controlling the operation of the optical switches through an operation monitor circuit of the light emitting or receiving devices. In this manner, the uneasiness of users and social influences causes by the suspension of communication can be eliminated.

Furthermore, an optical signal of a wavelength $\lambda_1$ is allowed to be incident to the input port of the main waveguide, the optical signal of the wavelength $\lambda_1$ is received by the light receiving device connected to the output port of the third branch waveguide, a light emitting device for generating the optical signal of the wavelength $\lambda_1$ which is connected to the output port of the second branch waveguide is driven by received signal through an amplification/wave shaping circuit and the optical signal of the wavelength $\lambda_1$ is outputted from the input port of the first branch waveguide. On the contrary, an optical signal of a wavelength $\lambda_2$ which is incident to the input port of the first branch waveguide is received by the light receiving device connected to the output port of the first branch waveguide, a light emitting device for emitting an optical signal of a wavelength $\lambda_2$ which is connected to the output port of the main waveguide is driven by received signal through the amplification/wave shaping circuit and this optical signal of the wavelength $\lambda_2$ is outputted from the input port of the main waveguide. In this manner, an optical repeater for bidirectional communication can be accomplished. Such a structure is entirely novel, exhibits high isolation over a wide band, drastically economizes the module and can be produced easily because it is an extremely simple structure. Furthermore, since the optical devices are arranged in parallel with the output ports, the structure is easy to fabricate. Since the input/output sides of light are arranged parallel on one side, they can be stored compactly inside the apparatus.

It is another object of the present invention to provide a bidirectional optical coherent communication method and system using the optical multi/demultiplexer described above.

The object described above can be accomplished by connecting one of the input waveguides of second and third optical multi/demultiplexers having the same structure as that of a first optical multi/ demultiplexer to the output waveguide of the first optical multi/demultiplexer having two waveguides which are disposed in parallel with each other, and which propagates two optical signals having mutually different wavelengths, cascading an optical modulator, a beam splitter and a semiconductor light emitting device in one of the output waveguides of the second and third optical multi/demultiplexers, cascading a beam splitter and a light receiving device in the rest of the output waveguides of the second and third optical multi/demultiplexers and allowing part of the optical signal of the semiconductor light emitting device to be incident to the light receiving device.

Since the present invention uses the optical multi/demultiplexers which combine the waveguides, it can accomplish bidirectional optical coherent communication with reduced noise and interference through a simple structure.

It is still another object of the present invention to provide an optical multi/demultiplexer capable of compensating for the shift of the center wavelength and the production method thereof.

The object described above can be accomplished by a directional coupler type optical multi/demultiplexer having a structure wherein a plurality of square waveguides (refractive index $n_c$; $n_c > n_b$) as a core are juxtaposed on a low refractive index layer (refractive index $n_b$) and are covered with a cladding having a refractive index $n_{cl}$ ($n_{cl} < n_c$, $n_{cl} \neq n_b$). The cladding consists of a film whose refractive index increases upon heat-treatment and the center wavelength of the optical multi/demultiplexer is controlled by adjusting the heat-treating time or a thermal energy quantity.

In accordance with the present invention, various structural parameters are measured at the stage where the core is formed on the low refractive index layer, the refractive index of the cladding is adjusted while the condition of the deviation from the design value is taken into consideration and the center wavelength shift can be corrected substantially completely. Therefore, the present invention can obtain the optical multi/demultiplexer at a yield of almost 100%.

BRIEF DESCRIPTION OF DRAWINGS

FIGS. 10 and 12 show shows examples of a bidirectional optical heterodyne communication method in accordance with the present invention, respectively;

FIG. 11 shows the insertion loss characteristics of a directional coupler used for the present invention;

FIG. 18 shows a method of adjusting the refractive index of the cladding by heat-treatment in accordance with the present invention;

BEST MODE FOR CARRYING OUT THE INVENTION

Figure 1:
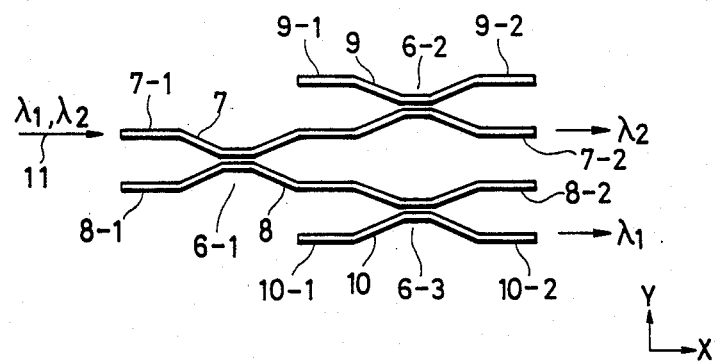
FIGS. 1 and 2 show the optical multi/demultiplexers in accordance with the embodiments of the present invention.
Figure 9:
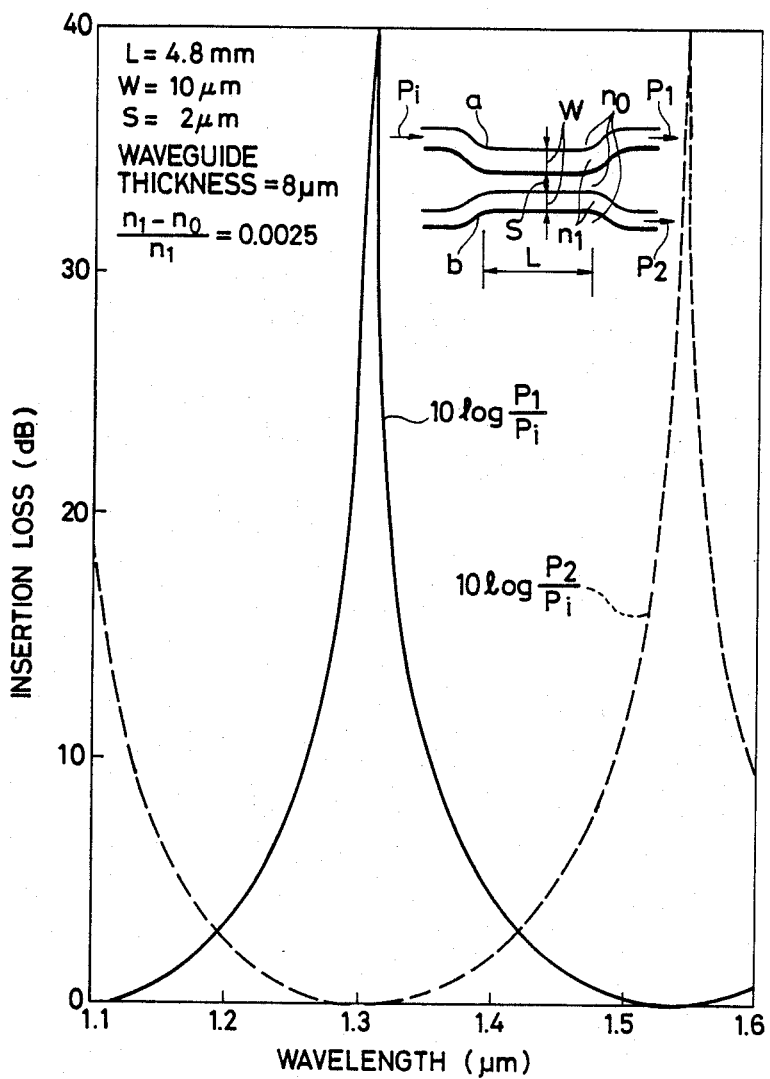
FIG. 9 shows the transmission loss characteristics of a conventional optical demultiplexer calculated by the inventor of the present invention.

FIG. 1 shows one embodiment of the optical multiplexer of the present invention. Reference numeral 7-1 represents an input side port of a main waveguide 1, and optical signals having wavelength $\lambda_1$, $\lambda_2$ are incident to this port as represented by arrow 11. Reference numeral 8-1 represents an input side port of a first branch waveguide 8. Reference numeral 6-1 represents a directional coupler type optical multi/demultiplexer formed by the main waveguide 7 and first branch waveguide 8 described above. Its structural parameters and the result of calculation of its wavelength characteristics are shown in FIG. 9. In other words, of the optical signals which have the wavelength $\lambda_1$ (e.g. 1.3 μm) and $\lambda_2$ (e.g. 1.55 μm) and are incident into the input side port 7-1 of the main waveguide 7 as represented by arrow 11, the optical signal of the wavelength $\lambda_1$ is branched by the optical multi/demultiplexer 6-1 and propagates through the output side port 8-2 of the first branch waveguide 8. The optical signal of the wavelength $\lambda_2$ is not branched but propagates as such through the output port side 7-2 of the main waveguide 7. The directional coupler type optical multi/demultiplexer 6-2 is composed of the output side of the main waveguide 7 and the second branch waveguide 9. This optical multi/demultiplexer 6-2 has the same structural parameters as those of 6-1 and has the same action. In other words, this optical multi/demultiplexer 6-2 branches the optical signal of the wavelength $\lambda_1$ leaking to the output side of the main waveguide 7 and lets it propagate to the output side port 9-2 of the second branch waveguide 9. Therefore, the optical signal component of the wavelength is hardly contained at the output side port 7-2 and the optical signal of the wavelength $\lambda_2$ which does not contain the unnecessary signal is picked up. In other words, the unnecessary interference signal does not mix. The optical multi/demultiplexer 6-3 having the same structural parameters and action as those of the optical multi/demultiplexers 6-1, 6-2 is disposed on the output side port 8-2 of the first branch waveguide 8 or in other words, the third branch waveguide 10 is disposed in parallel with, and coupled to, the output side of the first branch waveguide 8. Therefore, the optical signal of the wavelength $\lambda_1$ branched by the optical multi/demultiplexer 6-1 propagates through the output side of the first branch waveguide 8, is then isolated by the optical demultiplexer 6-3 and propagates inside the output side port 10-2 of the third branch waveguide 10. The optical signal of the unnecessary wavelength $\lambda_2$ contained in 8-2 propagates as such to the output side of 8-2. This means that the optical signal of the unnecessary wavelength $\lambda_2$ is hardly contained on the output side of 10-2 and only the optical signal of the wavelength $\lambda_1$ exists. Since this structure uses the three optical multi/demultiplexers 6-1, 6-2 and 6-3 having the same structural parameters and the same characteristics, an optical multi/demultiplexer which hardly contains any interference signal and has a high signal-to-noise ratio can be accomplished. Since such a device can be produced by merely combining the three same optical multi/demultiplexers, it is extremely advantageous. In other words, patterning can be made by mask-designing one optical multi/demultiplexer and then transferring and exposing the mask. Accordingly the mask cost is low. Moreover, since the mask is small in size, the dimensional accuracy of the mask can be improved.

Figure 2:
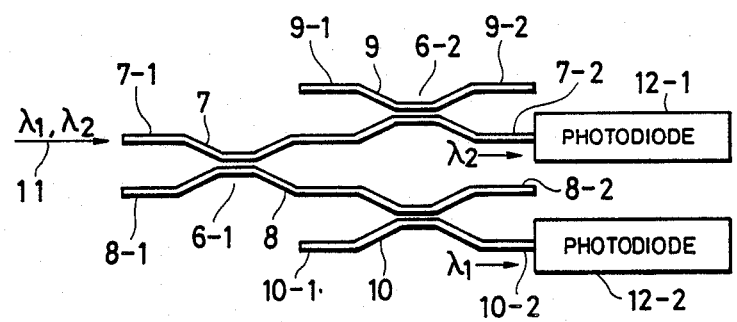

FIG. 2 shows the optical multi/demultiplexer in accordance with another embodiment of the present invention. A light receiving device 12-1 for receiving the optical signal of the wavelength $\lambda_2$ is disposed at the output side port 7-2 of the main waveguide 7, while a light receiving device 12-2 for receiving the optical signal of the wavelength $\lambda_1$ is disposed at the output side port 10-2 of the third branch waveguide 10.

Figure 3:
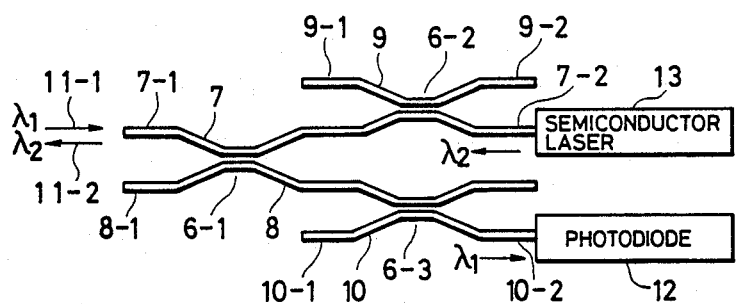
FIG. 3 shows a bidirectional transmission optical module in accordance with another embodiment of the invention.

FIG. 3 shows a bidirectional transmission module in accordance with still another embodiment of the present invention. A light emitting device (semi-conductor laser) 13 for emitting the optical signal of the wavelength $\lambda_2$ is disposed at the output side port 7-2 of the main waveguide 7 while a light receiving device (photodiode) 12 for receiving the optical signal of the wavelength $\lambda_1$ is disposed at the output side port 10-2 of the third branch waveguide 10 so that the optical signal of the wavelength $\lambda_2$ can be delivered in the direction represented by arrow 11-2 from the input side port 7-1 of the main waveguide 7 and the optical signal of the wavelength $\lambda_1$ arriving from the direction of arrow 11-1 can be propagated inside the optical module and be received by the light receiving device 12.

Figure 4A:
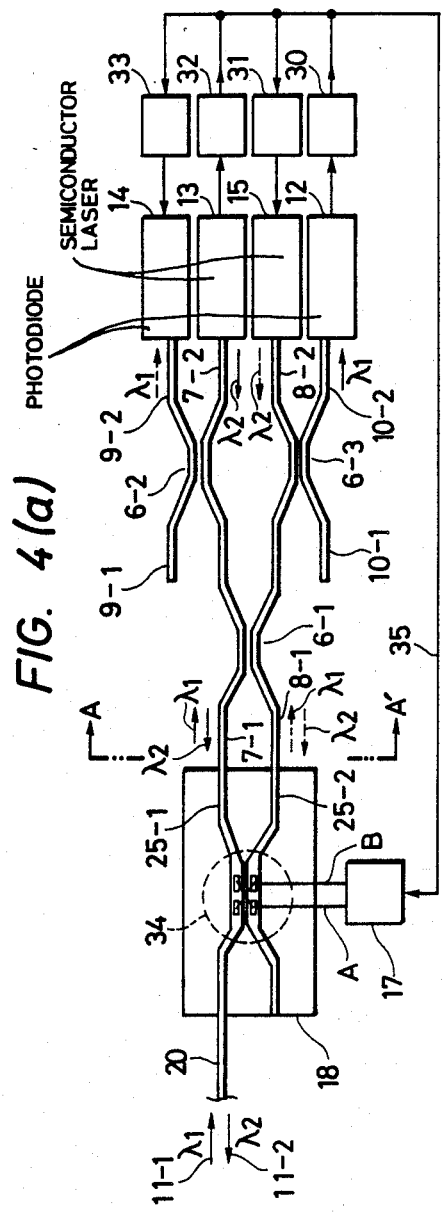
FIG. 4 shows a high reliability type optical module in accordance with still another embodiment of the invention.
Figure 4B:
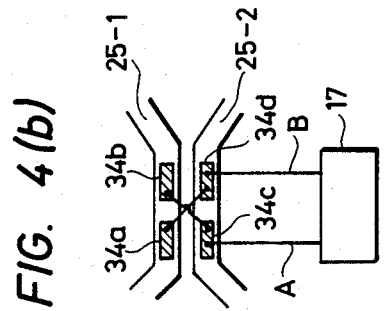

FIG. 4 shows a high reliability type optical module in accordance with still another embodiment of the present invention. This embodiment deals with an optical module having the structure wherein a light emitting device 15 and a light receiving device 14 are operated so as to insure normal communication when either one, or both, of a light emitting device 13 and a light receiving device 12 do not exhibit the desired operations due to degradation of their service life or breakage. An optical fiber transmission path 20 is connected to the optical module (on the right side of A–A' in the drawing) through an optical switch 18. The optical switch is of a 2×2 directional coupler type that is normally known in the art. When a voltage is applied across A and B at an electrode portion 34 formed at the joint portion of the directional coupler as shown in the drawing and when the voltage is at a certain impressed voltage $V_1$, the optical signal propagating inside the optical fiber 20 propagates inside the waveguide 7-1 through the waveguide 25-1 and when the voltage is at a certain impressed voltage $V_2$ which is higher than $V_1$, the optical signal propagating through the optical fiber 20 propagates inside the waveguide 8-1 through the waveguide 25-2. FIG. 4(b) is an enlarged view showing the electrode portion 34. Reference numerals 34a~34d represent electrodes, respectively. The optical switch 18 utilizes the change of the refractive index of the optical waveguide due to the electro-optical effect when a voltage is applied to one of the optical waveguides so as to utilize the phenomenon that the phases of two standing waves of an even-numbered mode and an odd-numbered mode change and optical interference changes at the output terminal of the directional coupler. (Refer to R. V. Schmidt and H. Kogelnik: "Electro-optically Switched Coupler with Stepped αB Reversal Using Ti-Diffused LiNbO$_2$ Waveguides; Appln. Phy. Lett.," 2(1976), 503).

This impressed voltage is first set to $V_1$. When either one, or both, of the light emitting device 12 and the light receiving device 12 become abnormal, the impressed voltage is changed from $V_1$ to $V_2$ as the driving circuit 17 is controlled by the control signal 35. Here, the driving circuit 17 has power supply sources $V_1$ and $V_2$ and switches and controls an electric switch by the control signal which of the power supply sources is to be selected so as to apply the voltage to the optical switch. This can be accomplished by a well known switching circuit.

Next, a generation system of the control signal when the optical devices 12 an 13 described above become abnormal and a method of shifting to the driving system of stand-by optical devices 14, 15 will be described. Either the optical input signal to the light receiving device 12 or the signal formed by converting this optical signal to an electric signal by the light receiving device 12 is applied to a signal monitor 30 and a comparison circuit. When this signal falls below a predetermined value (which is approximate to the minimum reception sensitivity level), the control signal 35 is generated at the output of the comparison circuit. The control signal 35 controls the driving circuit and at the same time, operates a driving circuit 33 of the light receiving device 14 so as to let it receive the optical signal of the wavelength $\lambda_1$. It operates also the driving circuit 31 for driving the light emitting device 15 so as to let it emit the optical signal of the wavelength $\lambda_2$. When the optical signal emitted from the light emitting device 13 falls below a predetermined value, too, the signal of 32 (optical signal or the signal prepared by converting it to an electric signal) is monitored by the monitor and is judged by the comparison circuit to generate the control signal 35 on the output side. This control signal 35 drives the light emitting device 15 as well as the light receiving device 14 and further drives the driving circuit 17 so as to change the impressed voltage from $V_1$ to $V_2$. In this manner, bidirectional transmission can be accomplished without suspension of communication due to failure.

Since fail-safe is provided as described above, reliability can be improved remarkably. Since it is not necessary to discard the optical multi/demultiplexer as a whole even when the optical devices are broken, a great economy can be attained. In other words, the present invention provides an optical module having an entirely novel structure equipped with fail-safe and trouble self diagnosis/restoration function (that is, the structure wherein the arrangement shown in FIG. 4 is integrated as a whole).

Figure 5:
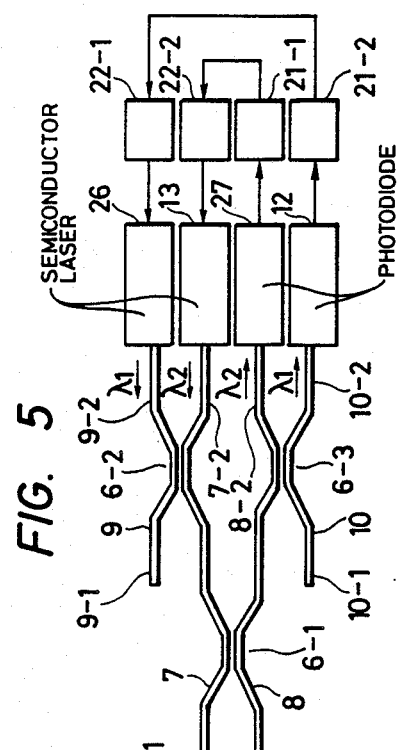
FIG. 5 shows a bidirectional optical relay module in accordance with still another embodiment of the invention.

FIG. 5 shows an example of an optical module for a bidirectional optical repeater as the application of the optical multi/demultiplexer of the present invention. In this optical module, the optical signal of the wavelength $\lambda_1$ optical signal transmitted from the preceding optical relay) which is incident to the input side port 7-1 of the main waveguide is branched by the optical multi/demultiplexer, branched by the optical multi/demultiplexer 6-3, enters the light receiving device 12, where it is converted to the electric signal, and is then inputted to the light emitting device driving circuit 22-1 through an operational amplifier and a waveform shaping circuit, for example, that are used widely and normally in electric circuitry. The light emitting device 26 is driven to emit the optical signal of the wavelength $\lambda_1$, which is branched by the optical multi/demultiplexers 6-2, 6-1 respectively, transmitted to the input side port 8-1 of the first branch waveguide 8, leaves this waveguide and is sent to a next optical repeater.

On the contrary, the optical signal of the wavelength $\lambda_2$ that is sent from the next optical repeater is incident to the input side port 8-1 of the first branch waveguide and sent to the light receiving device 27 through the optical multi/demultiplexers 6-1, 6-3. The information signal is converted to an electric signal at this light receiving device 27 and inputted to the light emitting device driving portion 22-2 through the amplification and waveform shaping circuits. This light emitting device driving portion 22-2 drives the light emitting device 13 to output the optical signal of the wavelength $\lambda_2$. The optical signal of the wavelength $\lambda_2$ is transmitted to the input side port 7-1 of the main waveguide through the optical multi/demultiplexers 6-2, 6-1, leaves this port 7-1 and is sent to the preceding optical relay. In this manner, the bidirectional optical repeater can be accomplished by use of the three same optical multi/demultiplexers.

Figure 6:
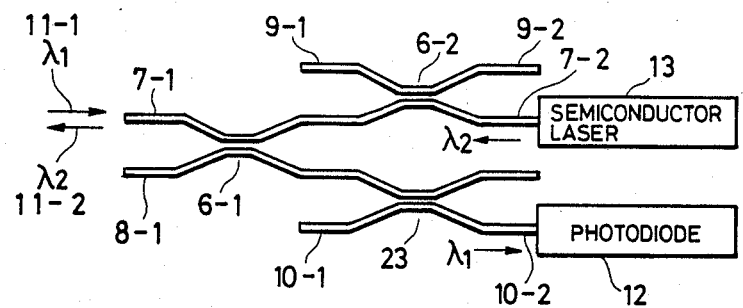
FIG. 6 shows a bidirectional transmission optical module in accordance with still another embodiment of the invention.
Figure 7:
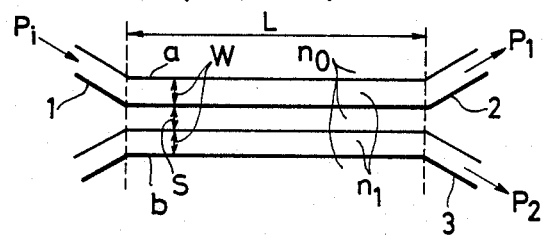
FIGS. 7 and 8 are schematic views showing a conventional optical demultiplexer.
Figure 8:
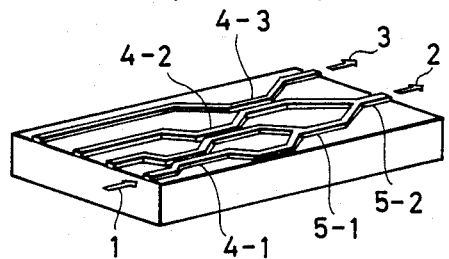

The present invention is not particularly limited to the embodiments described above. First of all, for or more optical multi/demultiplexers may be used beside the three same optical multi/demultiplexers. As shown in FIG. 6, it is possible to use the two same optical multi/demultiplexers 6-1, 6-2 in combination with another optical multi/demultiplexer 23 different from them, but the economical effect described already drops in this case. A semiconductor laser, a light emitting diode, and the like, can be used as the light emitting device, and an arbitrary wavelength can be selected.

The present invention provides the effects that high isolation can be maintained and drastic reduction of the cost of production can be attained by use of a plurality of optical multi/demultiplexers having the same structural parameters. Furthermore, the present invention can accomplish an entirely novel bidirectional optical module having fail-safe operation and a self diagnosis/restoration function and is effective for accomplishing communication having high reliability and high safety. As still another application, the present invention can constitute easily and economically a bidirectional optical relay module for the bidirectional relay and transmission between optical relays.

FIG. 10 shows an embodiment of a bidirectional optical heterodyne communication method in accordance with the present invention. The drawing shows a structural example of the optical module inside a station of either an upward-bound side or a downward bound side. An optical signal of the wavelength $\lambda_1$, $\lambda_3$ that propagates inside the optical fiber from the direction represented by arrow 11-3 (hereby called the upward-bound side) is incident to the waveguide 7 of the first optical multi/demultiplexer 6-1. On the contrary, the optical signal of the wavelength $\lambda_2$, $\lambda_4$ propagating through the waveguide 8 travels as represented by arrow 11-4 (hereby called the downward-bound side), propagates through the optical fiber and is sent to the station on the downstream side. In other words, the drawing shows an example of 4-wavelength bidirectional transmission having two wavelength each in the upward- and downward-bound directions.

The optical multi/demultiplexers 6-1, 6-2, 6-3 have the same structure and their structure and characteristics are shown in FIG. 11. When the optical signal Pi of the wavelength $\lambda_1$, $\lambda_2$, $\lambda_3$, $\lambda_4$ is incident to the waveguide a, the optical signal $P_1$ of the wavelength $\lambda_1$, $\lambda_2$ is guided to the output side of this waveguide a while the optical signal $P_2$ of the wavelength $\lambda_3$, $\lambda_4$ is guided to the output side of the waveguide b. Here, the wavelength $\lambda_1$ and $\lambda_2$ may be extremely approximate or equal to each other and the wavelength $\lambda_3$ and $\lambda_4$ may be extremely approximate or equal to each other. Assuming that the wavelength $\lambda_1$ and $\lambda_2$ are of the 1.3 μm and while the wavelength $\lambda_3$ and $\lambda_4$ are of the 1.5 μm band, such an optical multi/demultiplexer can be accomplished easily. Its structural parameters are, for example, W=10 μm, S=3.16 μm, L=4965 μm, thickness of the waveguide of 8 μm and the refractive index defference of 0.25% with the cladding covering the waveguide and its periphery.

In FIG. 10, reference numerals 48-1 to 48-4 represent beam splitter; 46 and 47 are optical modulators; 42 and 43 are semiconductor light emitting devices; and 44 and 45 are light receiving devices.

Next, the operation of FIG. 10 will be described. The optical signal of the wavelength $\lambda_1$, $\lambda_3$ is incident into the waveguide 7 as represented by arrow 11-3. The optical signal of the wavelength $\lambda_1$ tranvels as represented by arrow 41 through the optical multi/ demultiplexers 6-1, 6-2 and is incident into the beam splitter 48-1, and then into the light receiving device 44 (such as an avalanche photodiode or photodiode) through this beam splitter 48-1. The optical signal 40-2 of part of the semiconductor light emitting device 43 oscillating at the wavelength $\lambda_2$ is reflected by the beam splitters 48-2, 48-1 and is incident into this light receiving device 44. In other words, this optical signal 40-2 functions as a local oscillation signal and the light receiving device 44 makes optical heterodyne detection and reception by the optical signal 41 of the wavelength $\lambda_1$ and the optical signal 40-2 of the wavelength $\lambda_2$. High stability optical heterodyne detection can be accomplished by stabilizing the oscillation wavelength of this semiconductor light emitting device 3.

The other optical signal of the wavelength $\lambda_3$ that is incident into the waveguide 7 is sequentially branched by the optical multi/demultiplers 6-1, 6-3, propagates as represented by arrow 52 and is incident into the light receiving device 45 through the beam splitter 48-4. The optical signal 39-2 of part of the semiconductor light emitting device 42 oscillating at the wavelength $\lambda_4$ is reflected by the beam splitters 48-3, 48-4 and is incident into this light receiving device 45 and optical heterodyne detection is made by the optical signals of the wavelength $\lambda_3$ and $\lambda_4$. High stability optical heterodyne detection can be accomplished by stabilizing the oscillation wavelength of this semiconductor light emitting device 42. The remaining optical signal of the optical signal of the semiconductor light emitting device 43 oscillating at the wavelength $\lambda_2$ passes through the beam splitter 48-2 and reached the optical modulator 47, where the signal is subjected to external modulation. Its optical signal 40-1 is then guided through the optical multi/ demultiplexers 6-3, 6-1, travels through the waveguide 46 as represented by arrow 11-4, propagates inside the optical fiber and is transmitted to the station on the downstream side. The remaining optical signal of the optical signal of the semiconductor light emitting device 42 oscillating at the wavelength $\lambda_4$ passes through the beam splitter 48-3, and reaches the optical modulator 46 where it is subjected to external modulation by the information signal. After external modulation, the optical signal 39-1 is branched in the optical multi/demultiplexers 6-2, 6-1, propagates through the waveguide 46 as represented by arrow 11-4 and then through the optical fiber and is transmitted to the station on the downstream side. Optical homodyne detection is made when the wavelength $\lambda_1$ is equal to $\lambda_2$ and the wavelength $\lambda_3$ is equal to $\lambda_4$.

Since the structure shown in FIG. 10 uses the three optical multi/demultiplexers having the same structure, isolation can be made extremely greatly between the wavelength $\lambda_1$ and $\lambda_3$ and between the wavelength $\lambda_2$ and $\lambda_4$. Particularly in the case of coherent optical communication such as optical heterodyne detection and optical homodyne detection, interference between the wavelength will invite degradation of the signal-to-noise ratio and spoils the characteristic features of coherent optical communication. Therefore, the bidirectional coherent optical communication method having the optical multi/demultiplexers providing sufficiently great isolation between the wavelength such as described above is extremely advantageous. Since the structure in accordance with the present invention is symmetric and simple, it can be produced extremely easily and at a low cost of production. Moreover, since transmission is 4-wavelength bidirectional transmission, large capacity information transmission can be made easily. Since the semi-conductor light emitting devices 2, 3 are used both for the optical source for information transmission and for the optical source for local oscillation, the structure is more economical.

Figure 12:
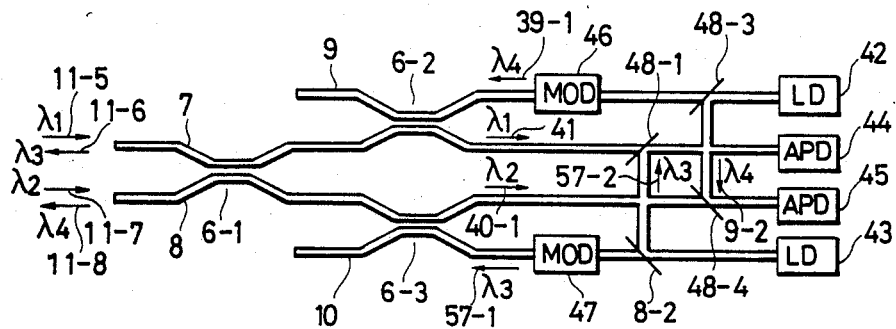

FIG. 12 shows another embodiment of the bidirectional optical heterodyne communication method in accordance with the present invention. This is a 4-wavelength bidirectional optical heterodyne communication method wherein the optical signals are transmitted in the mutually opposite directions inside the waveguide 8 as represented by arrows 11-7 and 11-8. In other words, the optical signals having the mutually different wavelength are transmitted bidirectionally in the respective optical fibers.

First of all, the optical signal of the wavelength $\lambda_1$ propagating as represented by arrow 11-5 is incident into the waveguide 7, travels through the optical multi/demultiplexers 6-1, 6-2 as represented by arrow 51 and is incident into the light receiving device 44 through the beam splitter 48-1. Part of the optical signal of the semiconductor light emitting device 43 oscillating at the wavelength $\lambda_3$ is branched by the beam splitter 48-2, is reflected by the beam splitter 48-1 and is inputted into this light receiving device 44 in the same way as the optical signal of the wavelength $\lambda_1$. Thus, optical heterodyne detection/ reception is made. The remaining optical signal of the semiconductor light receiving device 43 (of the wavelength $\lambda_3$) passes through the beam splitter 48-2 and is inputted into the optical modulator 47. The optical signal 57-1 modulated by the information signal is sequentially isolated by the optical multi/demultiplexers 6-3, 6-1, propagates inside the waveguide 7 and then through the optical fiber as represented by arrow 11-6 and is sent to the station on the downstream side.

The optical signal of the wavelength $\lambda_2$ that propagates as represented by arrow 11-7 is incident into the waveguide 8, travels through the optical multi/demultiplexers 6-1, 6-3 as represented by arrow 40-1 and is incident into the light receiving device 45 through the beam splitter 48-4. Part of the optical signal of the semiconductor light emitting device 42 oscillating at the wavelength $\lambda_4$ is branched by the beam splitter 48-3, travels as represented by arrow 49-2, is reflected by the beam splitter 48-4 and is inputted into this light receiving device 45 in the same way as the optical signal of the wavelength $\lambda_2$. Thus, optical heterodyne detection/ reception is made. The remaining optical signal (wavelength $\lambda_4$) of the optical signal of the semiconductor light emitting device 42 is inputted into the optical modulator 46 through the beam splitter 48-3 and the optical signal 49-1 modulated by the information signal in the optical modulator 49-1 is sequentially isolated by the optical multi/demultiplexers 6-2, 6-1, propagates through the waveguide 8 and then through the optical fiber as represented by arrow 11-8 and is sent to the station on the downstream side. High isolation characteristics, low cost of production and multi-wavelength bidirectional transmission can thus be accomplished by a simple structure in the same way as in FIG. 10.

According to the present invention, bidirectional optical coherent communication can be accomplished by a simple structure with characteristics having reduced degradation of a signal-to-noise ratio and interference degradation. Since the optical source for information transmission can be used also as the optical source for the local oscillator, the cost of production can be reduced.

Figure 13A:
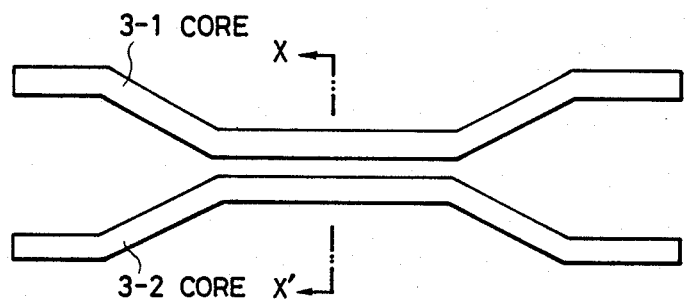
FIGS. 13 and 14 show the basic structure of the optical multi/demultiplexer of the present invention.
Figure 13B:
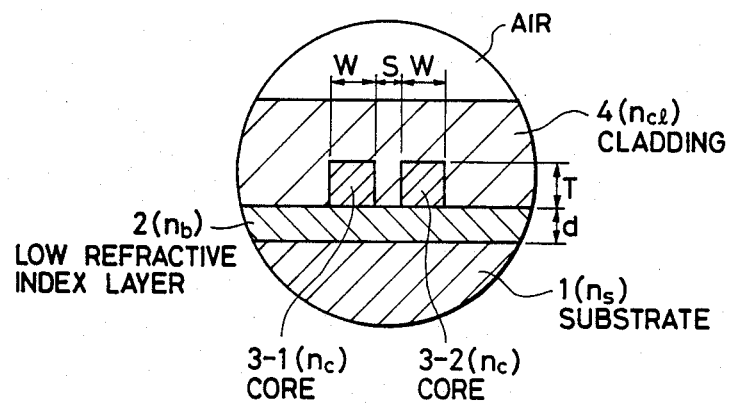
Figure 14A:
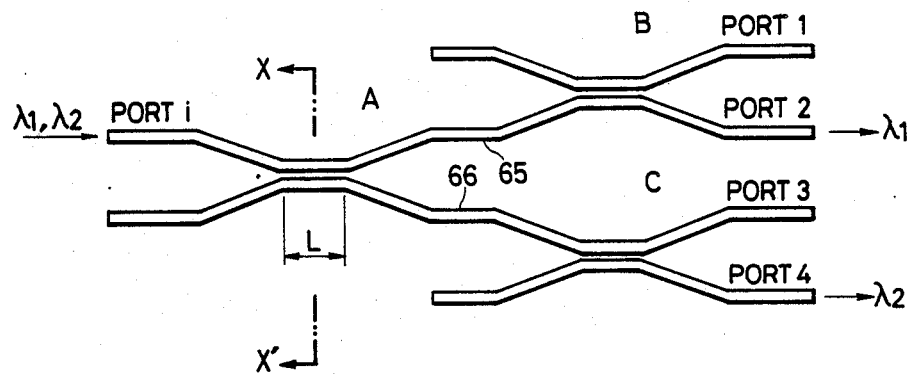

The basic structure of the optical multi/demultiplexer of the present invention is shown in FIGS. 13 and 14. FIG. 13 shows the case where the optical multi/demultiplexer is only one and FIG. 14 shows the case where three optical multi/demultiplexers are used. As can be seen from these drawings, a plurality (though two waveguides are shown in the drawing, three or more may be used) of square waveguides 3-1, 3-2 (having a refractive index $n_c$; $n_c > n_b$) as the core are juxtaposed on a low refractive index layer 2 (refractive index $n_b$) on a substrate 1 (refractive index $n_s$) and a cladding 4 having a refractive index $n_{cl}$ ($n_{cl} < n_c$, $n_{cl} \neq n_b$) covers the core waveguides. The refractive index $n_{Cl}$ of this cladding 4 may be lower or higher than $n_b$. Three directional couplers are used as shown in FIG. 14 in order to improve isolation between the wavelength and to minimize degradation of signal quality due to interference between the channels.

Namely, of the optical signal of the wavelength $\lambda_1$, $\lambda_2$ incident into the port i, the wavelength $\lambda_1$ is guided as such to the waveguide 65 but $\lambda_2$ is branched to the waveguide 66 in the optical multi/demultiplexer A. Next, in the optical multi/demultiplexer B, the undesired optical signal of the wavelength $\lambda_2$ leaking into the waveguide 65 is branched to the port 1 while only the desired optical signal $\lambda_1$ is taken out from the port 2. Similarly, in the optical multi/ demultiplexer C, the undesired optical signal of the wavelength $\lambda_1$ leaking to the waveguide 66 is guided as such to the port 3 while only the desired optical signal $\lambda_2$ is taken out from the port 4. As a result, isolation can be made extremely great between the wavelength $\lambda_1$ and $\lambda_2$. The optical multi/demultiplexers A, B, C have the same structure.

Figure 14B:
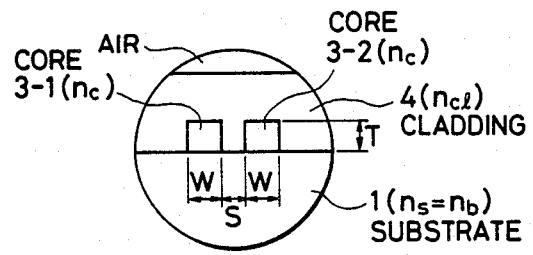

The refractive index $n_{cl}$ of the cladding 4 is made different from the refractive index $n_b$ of the low refractive index layer 2 for the following reason. In FIG. 14(b), the refractive index $n_s$ of the substrate is equal to the refractive index $n_b$ of the low refractive index layer. When the square waveguides 3-1, 3-2 are obtained by forming the film as the core on the low refractive index layer 2 and then through the production process such as coating of a photoresist, photolithography, reactive ion etching, removal of the photoresist, and the like, deviation occurs in the refractive index $n_c$ of the core, the width W and thickness T of the waveguide and the spacing S between the waveguides due to the process described above, and the center wavelength shift occurs. If a cladding having the same refractive index $n_b$ as that of the low refractive index layer 2 is put as such, all the resulting optical multi/ demultiplexers have the center wavelength shift and cannot at all be used. Therefore, in accordance with the present invention, the values $n_c$, W, T and S are measured at the stage where the core has been formed, and after the state of deviation is grasped, the refractive index $n_{cl}$ of the cladding 4 is selected in such a manner as to correct the center wavelength shift due to the deviation. As a result, the optical multi/demultiplexers can be accomplished at a production yield of 100% by setting $n_{cl}$ in such a manner as to correct completely the center wavelength shift due to the process deviation, and a drastic reduction of the cost of production can be also accomplished. As described above, the method which monitors the parameters at the intermediate stage of the production process and feeds back the monitored information to the process is extremely effective particularly for the optical multi/demultiplexer whose wavelength characteristics are changed even by slight deviation of the structural parameters. In this sense, the present invention provides an entirely novel process and an entirely novel optical multi/demultiplexer that are not known in the past.

Figure 15:
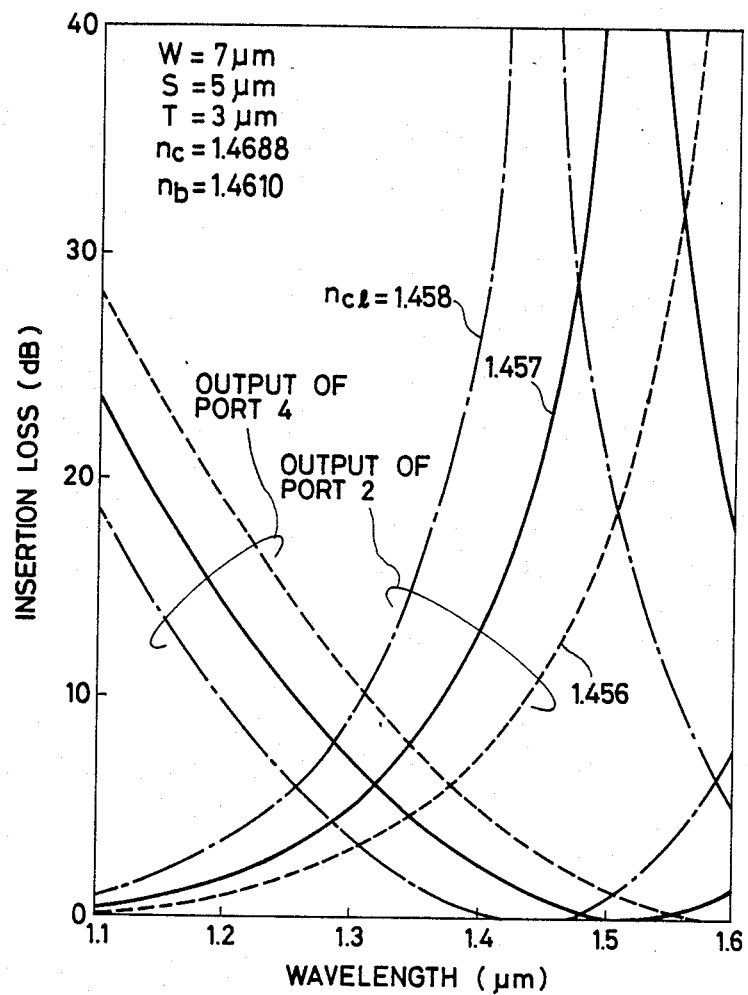
FIGS. 15 and 16 show the result of analysis of the transmission loss characteristics of the optical multi/demultiplexer of the present invention.
Figure 16:
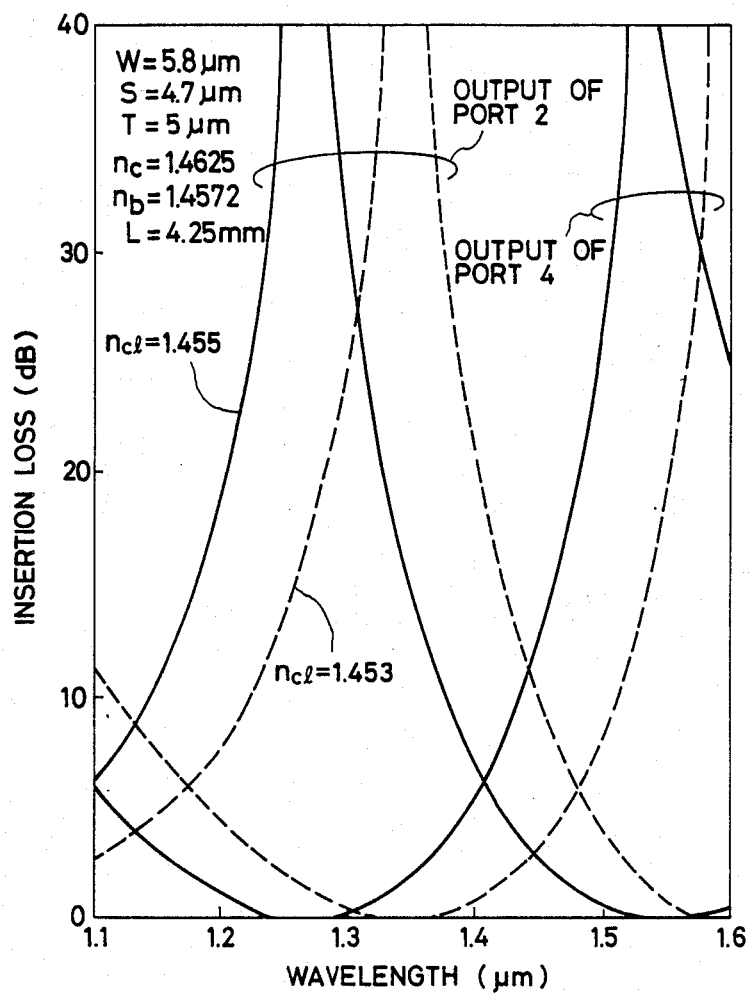

Next, the inventor of the present invention analyzed for the first time how the center wavelength characteristics can be controlled by the refractive index $n_{cl}$ of the cladding, and its result will be explained. FIGS. 15 and 16 show the result of analysis. As can be seen from the drawings, the center wavelength shifts with a varying $n_{cl}$ value. In other words, the present inventor found out for the first time that the center wavelength can be shifted by the $n_{cl}$ value.

Figure 17:
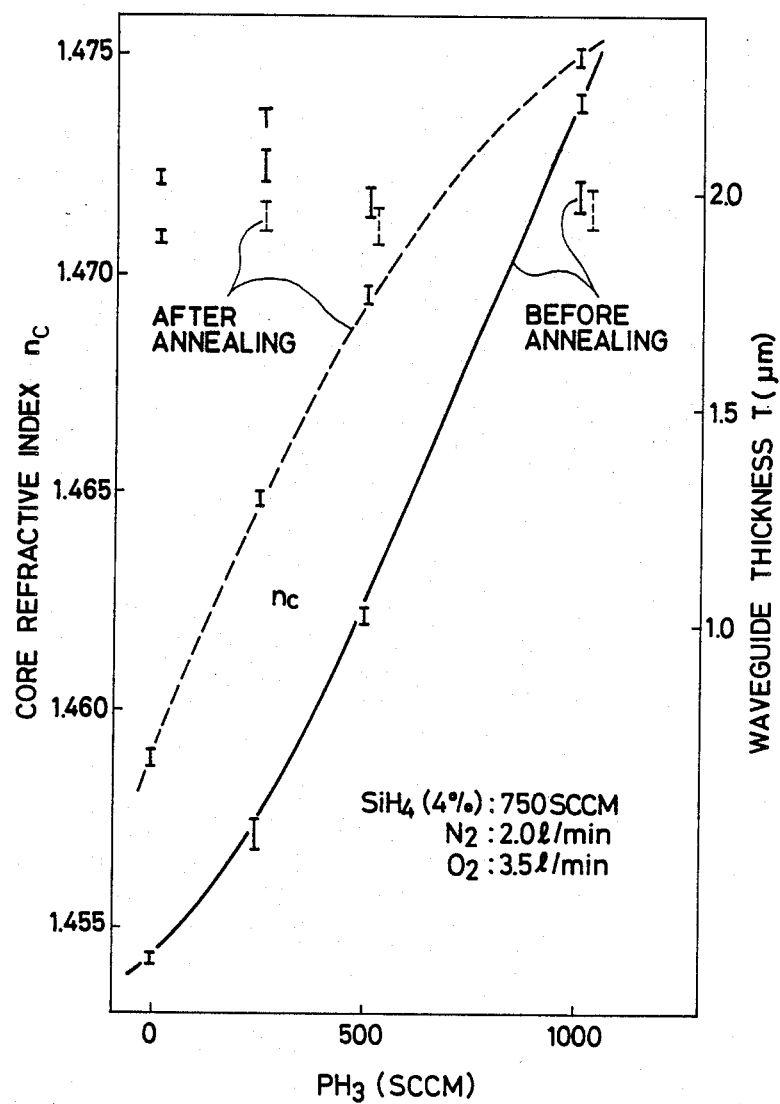
FIG. 17 shows the refractive index characteristics and the change of the refractive index characteristics by heat-treatment of the cladding fabricated by the present inventor.

Next, the method of forming the cladding having an arbitrary refractive index will be described. FIG. 17 shows the result of measurement of refractive index characteristics of the cladding film fabricated tentatively by the present inventor. It shows the refractive index characteristics of the film formed by causing monosilane $SiH_4$ (a gas diluted to 4% by $N_2$), phosphine $PH_3$ (a gas diluted to 1% by $N_2$) and $N_2$ and $O_2$ gases to flow on a silicon substrate heated to 390° C. The refractive index can be changed from 1.454 to 1.475 by changing the gas flow rate to $PH_3$. Curve of solid line represents the result of such a case and curve of dotted line represents the result of the case where heat-treatment is made at 1000° C. for about 10 hours (temperature rise time 2.5 hours, temperature retention time 0.5 hours and temperature lowering time 7 hours) in the air. The refractive index can be changed over a wide range when the heat treatment is made, too. It can be understood definitely from the result shown in FIG. 17 that the refractive index of the cladding can be changed over a wide range and the optical multi/demultiplexer of the present invention can thus be accomplished.

Figure 19:
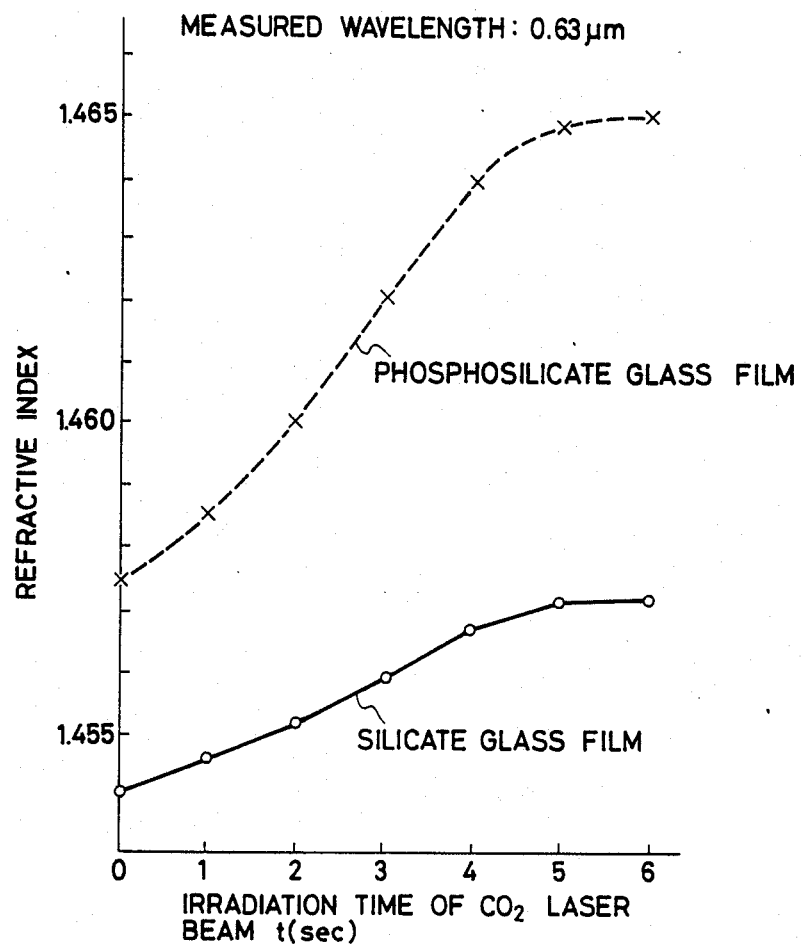
FIG. 19 shows the change of the refractive index characteristics by heat-treatment in accordance with the present invention.

FIG. 18 shows another method of changing the refractive index of the cladding. FIG. 18(a) is a top view and FIG. 18(b) is a sectional view taken along line X-X' of (a). In accordance with this method, an optical multi/demultiplexer having a film cladding whose refractive index changes by heat-treatment is produced in advance and then a ray of light 67 from a light source (e.g. white light source of wavelength $\lambda_1 \sim \lambda_n = 0.6 \sim 1.6 \mu m$ in this case) covering the measurement wavelength range is inputted from the input terminal of the optical multi/demultiplexer. The optical output 68, 69 of each output port is monitored by an optical spectrum analyzer. Next, a $CO_2$ laser beam is radiated to the upper surface of cladding 4 so as to move the beam on the pattern of the optical multi/demultiplexer in the direction of arrow 11 or to slide the optical multi/demultiplexer while keeping the beam fixed, and thus to apply thermal energy to the cladding 4 and to change the refractive index of the cladding. The center wavelength is controlled while observing the spectral output 69 by the optical spectrum analyzer. The spot size of the $CO_2$ laser beam radiation beam 70 is preferably a few millimeters in diameter so as to cover the pattern. The moving speed in the direction of arrow 71 and the optical output of the $CO_2$ laser beam are set while observing the shift condition of the center wavelength. FIG. 19 shows the result of actual measurement of the change of the refractive index of the cladding by the radiation of the $CO_2$ laser beam. This result is obtained by contracting the beam of about 10 W of the $CO_2$ laser source to a beam spot size of about 6 mm$\phi$ by a Ge lens and radiating the beam to a glass film (silicate glass film and phosphosilicate glasss film) formed at 390° C., as shown in FIG. 17. It was found that the refractive index could be controlled by the radiation time. The measuring wave length of the refractive index was 0.63 μm.

Figure 20:
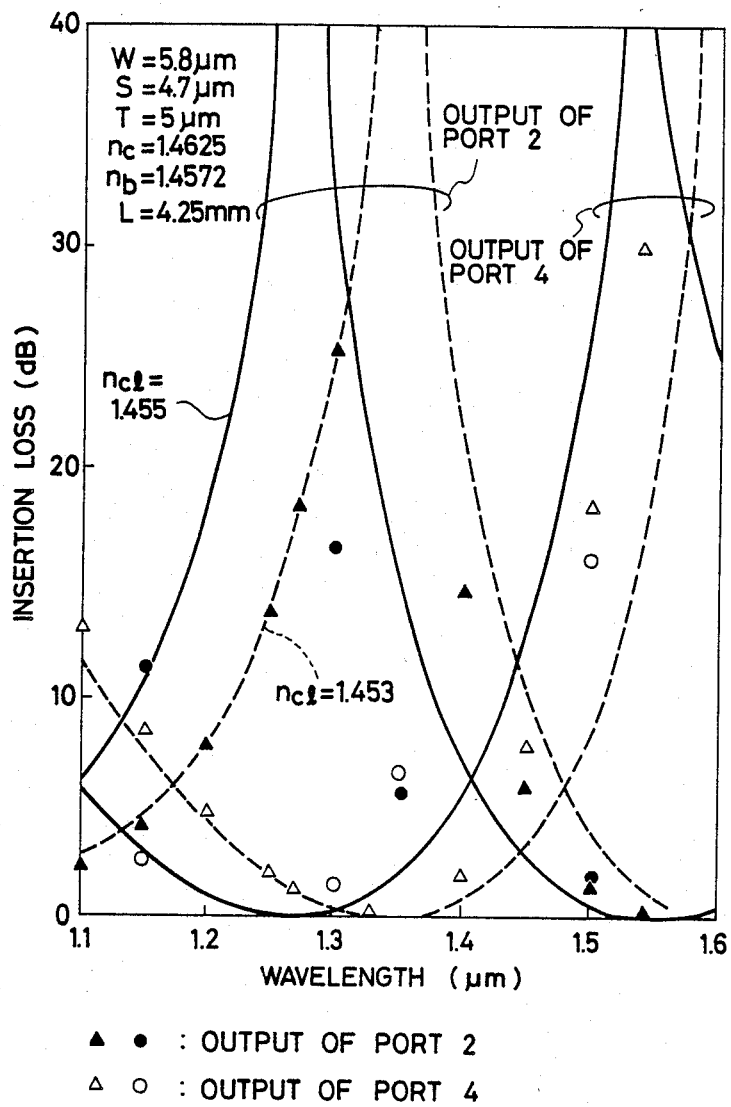
FIG. 20 shows the transmission loss characteristics of the prototype of the optical multi/demultiplexer of the present invention.

FIG. 20 shows the result of measurement of the insertion loss characteristics of the optical multi/ demultiplexer fabricated as a prototype. In the drawing, symbol α and represent the characteristics before heat-treatment and symbol and □ represent the characteristics after heat-treatment by the $CO_2$ laser. Incidentally, coupling loss between the optical fiber (single mode optical fiber) and the waveguide and waveguide loss are not contained in the drawing. Their total value is about 5 dB and most of the loss results from the coupling loss between the optical fiber and the waveguide.

The present invention is not particularly limited to the embodiments described above. The low refractive index layer, the core and the cladding may be made of a high polymer, a dielectric, a magnetic material, and the like, besides the glass. Besides the material described above, it is possible to use semiconductors such as Si, InP and GaAs for the substrate 1. An optical module can be constituted by mounting functional optical devices such as the semiconductor light emitting devices (semiconductor lasers, light emitting diodes, etc.) and light receiving devices on the optical multi/demultiplexer. The glass material may be quartz glass, quartz glass containing a dopant such as P, Ge, Ti or B and so-called multi-component system glass containing alkali metal and alkaline earth metal. Various heat-treating methods may be employed such as the methods using an electric furnace or radio frequency heating furnace and the methods using lasers such as $CO_2$ laser, YAG laser, and others. The glass film may be formed by first forming a soot-like film and then changing it to glass by sintering. The core need not be completely square but may be elliptic or round. Furthermore, three optical multi/demultiplexers shown in FIG. 13 may be combined as shown in FIG. 14 or two of them may be combined. Moreover, four or more optical multi/demultiplexers may be combined in order to increase the wavelength multiplex number.

In accordance with the present invention, it is possible to measure the various structural parameters at the sage where the core has been formed on the low refractive index layer and the refractive index of the cladding can be controlled while the state of deviation from the design value is taken into consideration in order to correct completely the center wavelength shift. Accordingly, the optical multi/demultiplexer can be accomplished at the yield of 100%. As a result, the optical multi/demultiplexer can be produced at a lower cost than by the prior art technique.

What is claimed is:

1. An optical multi/demultiplexer characterized in that a first branch waveguide for branching an optical signal having a wavelength $\lambda_1$ is disposed in parallel with, and connected, to a main waveguide for propagating an optical signal of wavelength $\lambda_1$ and $\lambda_2$, a second branch waveguide for branching the optical signal of the wavelength $\lambda_1$ is further disposed in parallel with, and coupled to, the output side of said main waveguide and a third branch waveguide for branching the optical signal of the wavelength $\lambda_1$ is disposed in parallel with, and coupled to, the output side of said first branch waveguide.

2. An optical module comprising optical multi/ demultiplexers and semiconductor optical devices, said optical multi/demultiplexer including a first branch waveguide for branching an optical signal of a wavelength $\lambda_1$, disposed in parallel with, and coupled to, a main waveguide for propagating an optical signal of wavelength $\lambda_1$ and $\lambda_2$, a second branch waveguide for branching the optical signal of the wavelength $\lambda_1$, disposed in parallel with, and coupled to, the output side of said main waveguide, and a third branch waveguide for branching the optical signal of the wavelength $\lambda_1$, disposed in parallel with, and coupled to, the output side of said first branch waveguide, and said semiconductor optical devices being connected to the output sides of said main waveguide and sad third branch waveguide.

3. An optical module according to claim 2, wherein a semiconductor light emitting device for emitting the optical signal of the wavelength $\lambda_1$ or a semiconductor light receiving device for receiving the optical signal of the wavelength $\lambda_1$ is connected to the output sides of said second and third branch waveguides, and a semiconductor light emitting device for emitting the optical signal of the wavelength $\lambda_2$ or a semiconductor light receiving device for receiving the optical signal of the wavelength $\lambda_2$ is connected to the output sides of said main waveguide and said first branch waveguide.

4. An optical module according to claim 2 or 3, wherein the input sides of said main waveguide and said first branch waveguide are connected to the output ports of a 1×2 type optical switch having one input port and two output ports, and an optical fiber is connected to said input port.

5. An optical module according to claim 4, wherein selection and switching of the output ports of said optical switch are controlled by a monitor signal for monitoring the operation state of said semiconductor optical devices connected to the output sides of said respective waveguides.

6. An optical module according to claim 2, wherein a light receiving device for receiving the optical signal of the wavelength $\lambda_1$ is connected to the output side of said third (second) branch waveguide, the output signal of said light receiving device is applied to a light emitting device for emitting the optical signal of the wavelength, connected to the output side of said second (third) branch waveguide through an amplification/waveform shaping circuit, a light receiving device for receiving the optical signal of the wave-length $\lambda_2$ is connected to the output side of said first branch (main) waveguide, and the output signal of said light receiving device is applied to a light emitting device for emitting the optical signal of the wavelength $\lambda_2$, connected to the output side of said main (first branch) waveguide through an amplification/ waveform shaping circuit.

7. A bidirectional optical coherent communication method characterized in that one of the input waveguides of each of second and third directional couplers having the same structure as that of a first directional coupler is connected to the output waveguide of said first directional coupler having two waveguides juxtaposed with each other, two optical signals having mutually different wavelength are propagated through the input waveguides of said first directional coupler, an optical modulator, a beam splitter and a semiconductor light emitting device are cascaded with one of the output waveguides of said second and third directional couplers, beam splitters and light receiving devices are cascaded with the rest of the output waveguides of said second and third directional couplers, and part of the optical signal of said light emitting device is allowed to be incident into said light receiving device.

8. A bidirectional optical coherent communication method according to claim 7, wherein the wavelengths of the optical signal propagating through the two input waveguides of said first directional coupler are $\lambda_1$ and $\lambda_3$ in both input waveguides, or $\lambda_1$ and $\lambda_3$ in one of the waveguides and $\lambda_2$ and $\lambda_4$ in the other waveguide, respectively.

9. A bidirectional optical coherent communication method according to claim 7 or 8, wherein the propagating direction of the optical signals propagating through the input waveguides of said directional couplers is the same, or opposite.

10. An optical multi/demultiplexer comprising:
a substrate;
a low refractive index layer on the substrate;
a plurality of substantially square waveguides (refractive index $n_c$; $n_c > n_b$) as cores juxtaposed on the low refractive index layer (refractive index $n_b$); and
a cladding having a refractive index $n_{cl}$ ($n_{cl} < n_c$, $n_{cl} \neq n_b$) covering the waveguides.

11. An optical multi/demultiplexer according to claim 1, wherein two or more optical multi/demultiplexers are combined with one another.

12. An optical multi/demultiplexer according to claim 1 or 2, wherein the refractive index of said cladding changes upon heat-treatment.

13. A method of producing an optical multi/demultiplexer characterized by the steps of juxtaposing a plurality of substantially square waveguides (refractive index $n_c$; $n_c > n_b$) as the core on a low refractive index layer (refractive index $n_b$), covering said core waveguides with a cladding having a refractive index $n_{cl}$ ($n_{cl} < n_c$, $n_{cl} \neq n_b$) which changes upon heat-treatment, and heat-treating said cladding so as to shift the center wavelength of the branching characteristics.

14. A method of producing an optical multi/ demultiplexer according to claim 13, wherein the refractive index of said cladding is adjusted by radiating a $CO_2$ laser beam onto the upper surface of said cladding to as to shift the center wavelength.

* * * * *